United States Patent
Nelson et al.

(10) Patent No.: US 12,203,679 B1
(45) Date of Patent: Jan. 21, 2025

(54) AIR-COOLING DEVICE

(71) Applicants: Robert William Nelson, Winter Springs, FL (US); Richard Hunton, Indian Harbour Beach, FL (US)

(72) Inventors: Robert William Nelson, Winter Springs, FL (US); Richard Hunton, Indian Harbour Beach, FL (US)

(*) Notice: Subject to any disclaimer, the term of this patent is extended or adjusted under 35 U.S.C. 154(b) by 0 days.

(21) Appl. No.: 17/391,203

(22) Filed: Aug. 2, 2021

Related U.S. Application Data

(63) Continuation of application No. 15/833,145, filed on Dec. 6, 2017, now Pat. No. 11,079,123.

(60) Provisional application No. 62/431,247, filed on Dec. 7, 2016.

(51) Int. Cl.
| | |
|---|---|
| F24F 5/00 | (2006.01) |
| F24F 7/007 | (2006.01) |
| F24F 13/22 | (2006.01) |
| F25D 3/08 | (2006.01) |

(52) U.S. Cl.
CPC .......... *F24F 5/0017* (2013.01); *F24F 7/007* (2013.01); *F24F 13/22* (2013.01); *F25D 3/08* (2013.01); *F24F 2013/228* (2013.01); *F24F 2203/026* (2013.01); *F24F 2221/12* (2013.01); *F25D 2303/0822* (2013.01)

(58) Field of Classification Search
CPC ...... F25D 3/08; F25D 3/06; F25D 2303/0822; F25D 2303/08; F25D 2303/0821; F25D 2303/083; F25D 31/003; F24F 5/0017; F24F 5/0021; F24F 7/007; F24F 13/22; F24F 2013/228; F24F 2203/026; F24F 2203/028; F24F 2221/12; B67D 1/0865; B67D 1/0867; B67D 1/0868; B67D 1/0864
See application file for complete search history.

(56) References Cited

U.S. PATENT DOCUMENTS

| | | | |
|---|---|---|---|
| 2,750,167 A * | 6/1956 | Gregg .................. | F24F 5/0035 261/24 |
| 11,079,123 B1 * | 8/2021 | Nelson .................. | F24F 5/0017 |

(Continued)

OTHER PUBLICATIONS

Collins Dictionaries (Ed.). (2014). Surround. In Collins English Dictionary (12th ed.). Collins. https://search.credoreference.com/articles/Qm9va0FydGljbGU6MzczNzlwMA==? aid=279753 (Year: 2014).*

*Primary Examiner* — Tavia Sullens
(74) *Attorney, Agent, or Firm* — John Rizvi; John Rizvi, P.A.—The Patent Professor®

(57) ABSTRACT

A modular, cooling device for providing cool air to a body and/or an external environment comprises a first body portion combining a cooling medium and air passageways therethrough. The first body portion may be detached from second and third body portions and placed in a freezer to refreeze the cooling media, and reattached for further use. The second body portion may include a material that absorbs condensate that forms within the air passageways. The third body portion may include a fan for driving air into the cooling device, through the air passageways and out of the cooling device. When passing through the air passageways, a heat transfer is produced between the passing air and the cooling medium, cooling the passing air. The fan speed may be varied to adjust air flow.

18 Claims, 15 Drawing Sheets

(56) References Cited

U.S. PATENT DOCUMENTS

2006/0248917 A1* 11/2006 Urfig ................ F24F 5/0017
62/425
2011/0272054 A1* 11/2011 Yang ................ F24T 10/15
138/149

* cited by examiner

AIR-COOLING DEVICE

CROSS-REFERENCE TO RELATED APPLICATIONS

This application is a Continuation Patent Application of U.S. Non-Provisional patent application Ser. No. 15/833,145, filed on Dec. 6, 2017, which in turn claims the benefit of U.S. Provisional Patent Application No. 62/431,247, filed on Dec. 7, 2016, which is incorporated by reference herein in its entirety.

FIELD OF THE INVENTION

The present invention relates generally to a device for providing cool air to a human body and an external environment, and more specifically, to an air-cooling device that is portable and can have an extended cooling effect.

BACKGROUND OF THE INVENTION

There are devices for providing cool air to a human body or an external environment. Many of these devices involve the use of a cooling medium and a fan. Essentially, the fan causes air to pass through the device, and to pass around the cooling medium which is contained in the device. When the air passes by the cooling medium, a heat exchange takes place between the air and the cooling medium which cools down the air. The cooled air is expelled from the device to provide cool air to an external environment, such as a room, and a person who may be present.

The cooling medium can be in the form of ice, which can then be drained out or used as water when melted. It can also be in the form of a reusable material, such as a gel or polymeric compound, that can be refrozen after use of the device. In this form, the cooling medium can be held within an object that itself can be placed within the device while in use, and afterwards taken out of the device and put back into a freezer to be refrozen. Examples of such an object would be a rectangular case to fit within a cover of a cooler, or balls used in drinking glasses. The reusable form of the cooling medium potentially allows for conservation of water, since it does not involve water, and one can reuse the cooling medium.

A problem with such current devices is that the cooling effect of the cooling medium cannot be preserved or made to last longer. The result is that as soon as the device is put into use, the entire amount of the cooling medium begins to warm up or melt, thus declining in its ability to provide a cooling effect. There exists a need, then, for a modification on such devices that would allow for the cooling medium to have its cooling effect preserved or extended, thus increasing the time for which the device can be used before having to refreeze the cooling medium. Another aspect of such current devices is that some are portable. However, even this portability is limited. Some devices can be hand-held, and others can be worn on a human body, for instance hung around a neck via a lanyard; but these modes of portability can be inconvenient (not hands-free) or uncomfortable (causing neck strain). Thus, a need exists for a modification on these devices that would make them more conveniently and comfortably portable.

Some such current devices can also be attached to other objects, to be held in place while in use. Again though, this feature is often limited, due to the size or construct of the device. Therefore, another need for modification is one that would allow the device to be of a size that can be attached to a wider range of objects, as well as the ability to reassemble the device to better fit and operate on these objects.

Thus, there remains a need in the art for a portable cooling device which solves at least one of the problems described above.

SUMMARY OF THE INVENTION

The present invention is directed to a cooling device for providing cool air to a human body (or any living creature) and an external environment, that is easily portable by hand. The cooling device comprises a first body portion including a main chamber which houses a cooling medium. The first body portion further houses a plurality of air passageways or tubes extending through the cooling medium. A fan (or blower) can pull or push air through the cooling medium. The cooling medium provides a cooling effect by heat exchange or removing enthalpy from air passing through the tubes adjacent to the cooling medium within the main chamber. The first body portion may be placed into a freezer without any other components of the device. It not necessary to extract the cooling medium from the first body portion in order to cool or refreeze the cooling medium.

In a first implementation of the invention, a cooling device for providing cool air to a living being or an external environment comprises a hollow device body defining a main chamber containing a cooling medium. At least one air passageway is arranged through the main chamber and cooling medium. At least one air inlet and at least one air outlet are formed in the device body, in fluid communication with the at least one air passageway. The cooling device further includes a fan configured to displace outside air through the at least one air inlet, into the device body, through the at least one air passageway, and outwardly from the device body through the at least one air outlet. The cooling medium is configured to cool outside air passing through the at least one air passageway by heat exchange with the outside air passing through the at least one passageway.

In a second aspect, the device body can include a first end and an opposite second end. The one or more air outlets can be arranged at the first end of the device body. In some embodiments, the one or more air inlets can be arranged at the first end of the device body. In other embodiments, the one or more air inlets can be arranged at the second end of the device body.

In another aspect, the device body can include a second body portion containing a water-absorbent material within a second chamber of the second body portion. The second chamber of the second body portion can be in fluid communication with the at least one air passageway and the water-absorbent material can be configured to collect condensate from the tubes as the outside air is displaced by the fan and cooled by heat exchange with the cooling material. In some embodiments, the water-absorbent material can be removable from the second chamber. In some embodiments, the second body portion can be arranged at the second end of the device body.

In another aspect, the device body can include a first body portion comprising the main chamber and a second body portion comprising the second chamber, and the second body portion can be disconnectably attachable to the first body portion.

In yet another aspect, the one or more air passageways can include one or more straight air passageways.

In another aspect, the one or more air passageways can include one or more coiled air passageways.

In another aspect, the device body can further include a third body portion containing the fan, wherein the third body portion is in fluid communication with the at least one air passageway.

In another aspect, the cooling device can further include at least one battery configured to power the fan. The battery or batteries can be housed inside the third body portion.

In another aspect, the third body portion can be arranged at the second end of the device body and the at least one air outlet can be provided in the third body portion. In some embodiments, the third body portion can also include the at least one air inlet.

In yet another aspect, the cooling medium can include a material having a freezing temperature no greater than 32° F.

In another aspect, the device body can be configured to be grasped by a hand.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
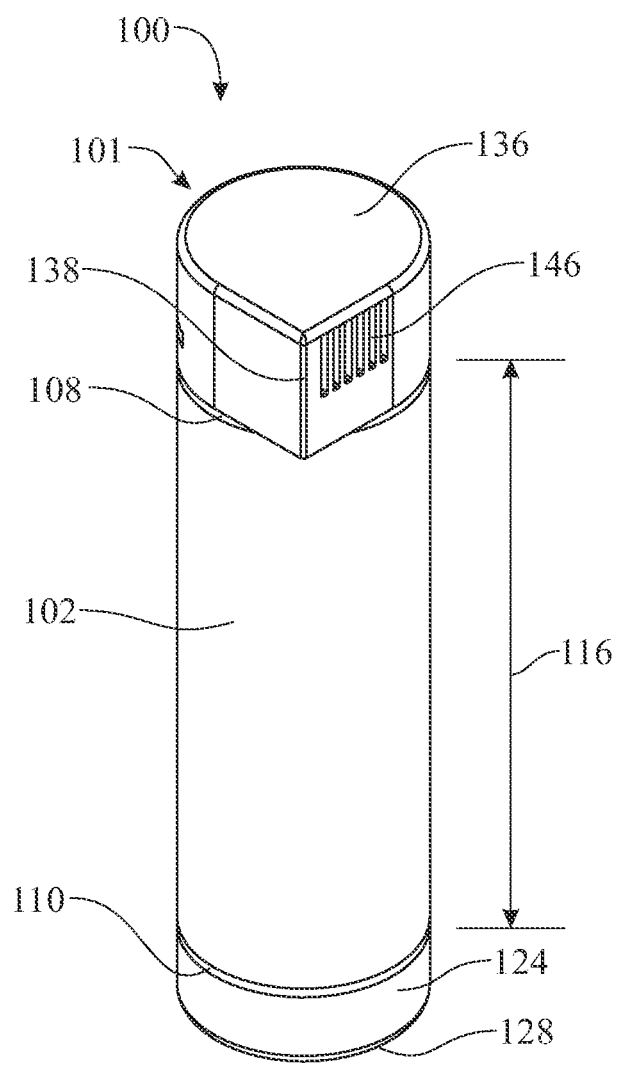
FIG. 1 presents a top front perspective view of a cooling device in accordance with a first illustrative embodiment of the invention.
Figure 2:
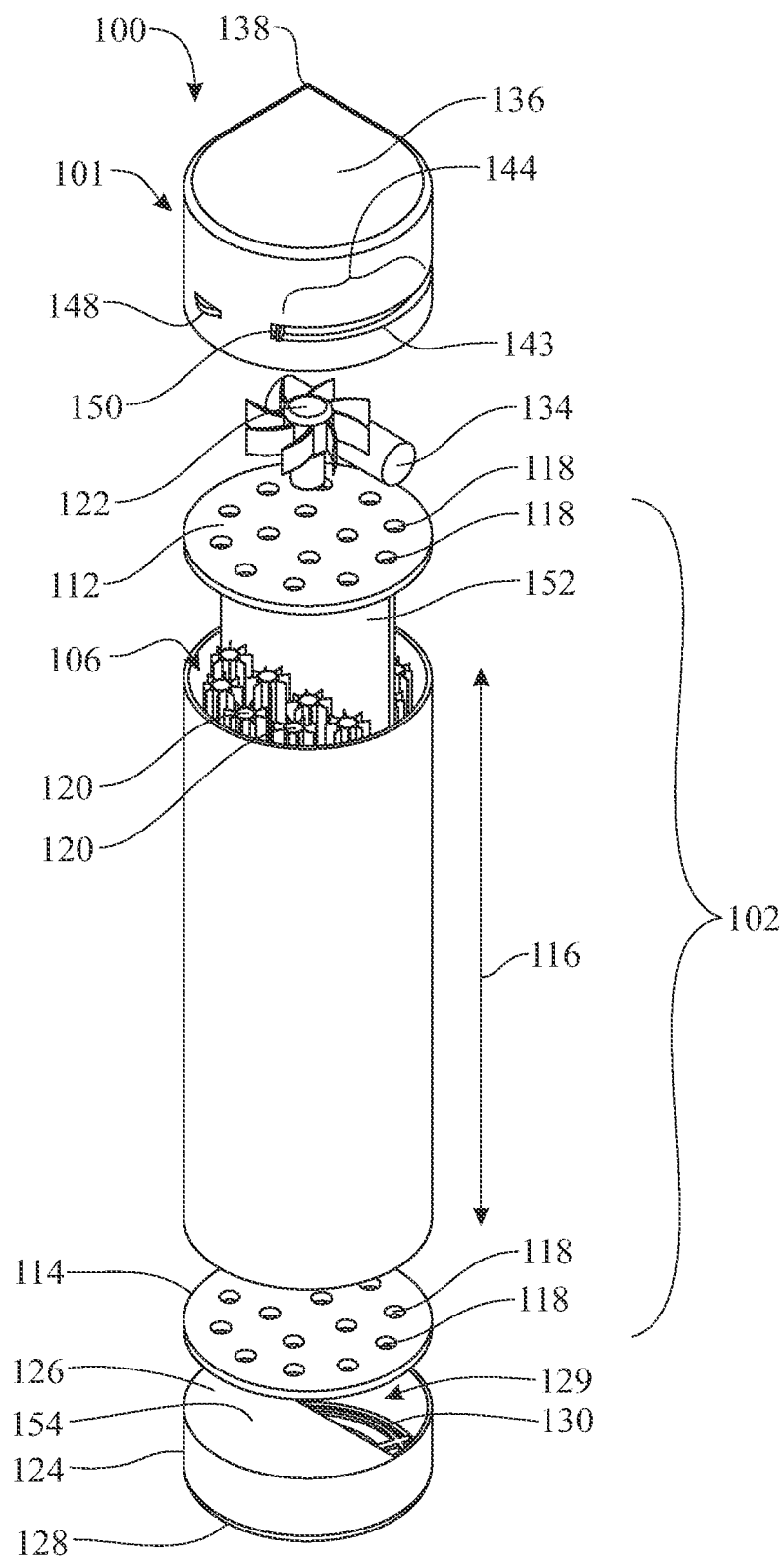
FIG. 2 presents an exploded top rear perspective view of the cooling device of FIG. 1.
Figure 4:
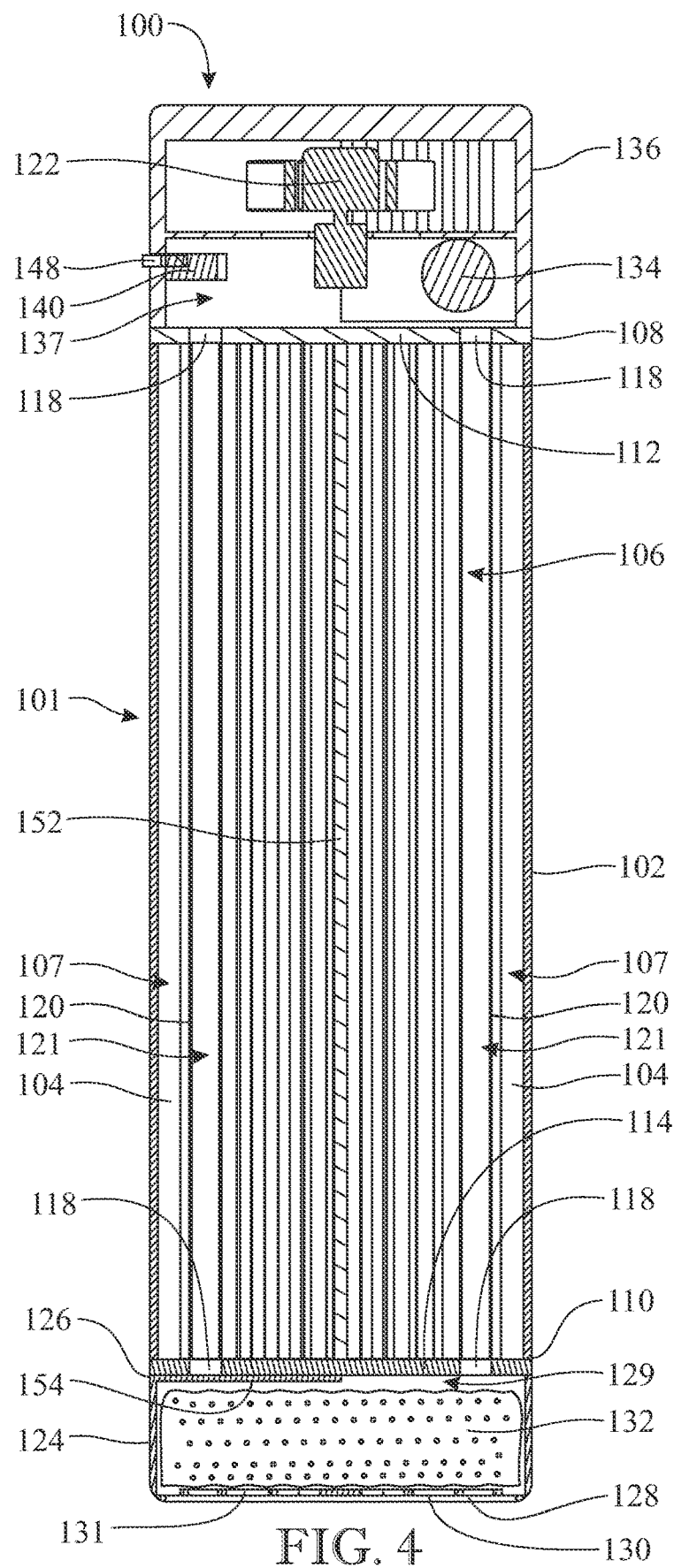
FIG. 4 presents a cross-sectional side elevation view of the cooling device of FIG. 1, the cross-section taken perpendicularly to the partition.
Figure 5:
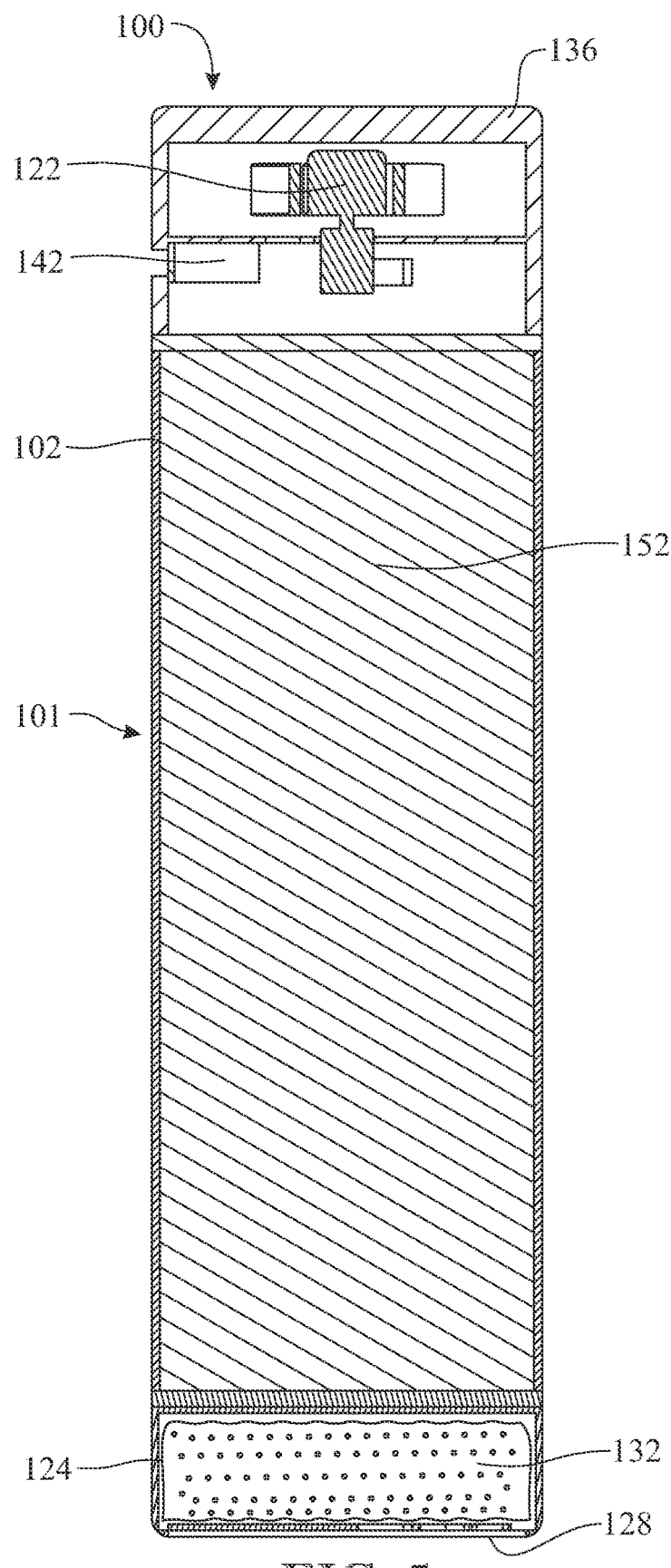
FIG. 5 presents a further cross-sectional side elevation view of the cooling device of FIG. 1, the cross-section taken along the partition.
Figure 6:
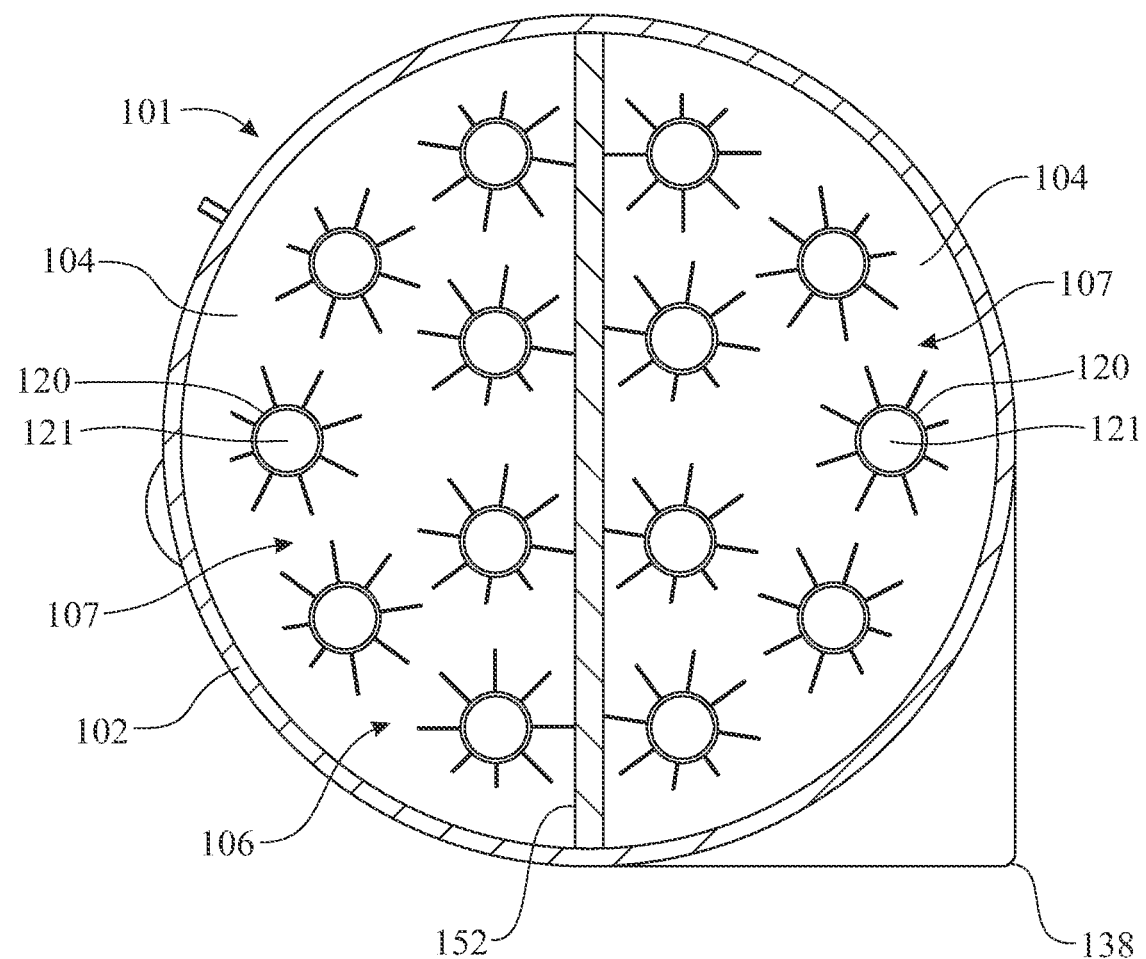
FIG. 6 presents a cross-sectional top plan view of the cooling device of FIG. 1.

As generally depicted in all of FIGS. 1-7, a cooling device 100 for providing cool air to a human body 156 and an external environment is portable and comprises hollow device body 101. The device body 101 includes a hollow cell or first body portion 102, for housing a cooling medium 104. As shown in FIGS. 1 and 2, the first body portion 102 comprises an internal space or main chamber 106, a top end 108, and a bottom end 110. The top end 108 and the bottom end 110 of the first body portion 102 have a cover 112 and 114, respectively. The main chamber 106 of the first body portion 102 has a length 116. The cover 112 of the top end 108 of the first body portion 102 and the cover 114 of the bottom end 110 of the first body portion 102 can optionally have a planar geometry, as best shown in FIG. 2. The covers 112, 114 can have one or more through openings for allowing the passing of air therethrough; for instance, the covers 112, 114 can comprise a plurality of holes 118 (such as in the present embodiment, in which the covers 112, 114 each comprise fourteen holes 118). The first body portion 102 further includes one or more air conduits or tubes 120 housed within the main chamber 106. For instance and without limitation, the first body portion 102 can include a plurality of tubes 120, such as but not limited to fourteen tubes 120 as depicted herein. The tubes 120 may have any cross-section and may be straight, coiled and/or have extended fins that protrude into the cooling medium 104 or into the internal space or air passageway 121 of the tubes 120 for enhanced heat transfer; for instance, the tubes 120 shown herein are straight, generally cylindrical and include outward, radial fins. Each tube 120 extends along the length 116 of the main chamber 106, from a respective opening 118 on the top cover 112 to a respective opening on the bottom cover 114, providing fluid communication between the respective openings 118 of the covers 112, 114 at each end of the tube 120. As best shown in FIG. 6, each tube 120 comprises an internal space or air passageway 121 which is in fluid communication with the openings 118 at opposite ends of the tube 120 and through which air can flow, for purposes that will be described hereinafter. The tubes 120 are arranged in a spaced-apart relationship with one another and the cooling medium 104 is located in between the tubes 120, for cooling the air passing through the tubes 120 as will be described in greater detail hereinafter.

The first body portion 102 can include at least one thermal insulation material. In some embodiments, the top and bottom covers 112, 114 can also be made of at least one thermal insulation material. Thus, the main chamber 106 can be thermally insulated allowing the cooling medium 104 to remain cool for an extended period of time. In some embodiments, the second body portion 124 and/or third body portion 136 can be made of at least one thermally insulated material, further contributing to reduce internal air temperature and preserve the cooling medium 104.

The cooling medium 104 can comprise a material having a freezing temperature no greater than 32° F. In a variant of the cooling device 100, the cooling medium 104 can include a gel. Alternatively or additionally, the cooling medium 104 can include a liquid. Alternatively or additionally, the cooling medium 104 can include a plurality of polymer beads. Alternatively or additionally, the cooling medium 104 can include a phase change material.

Figure 3:
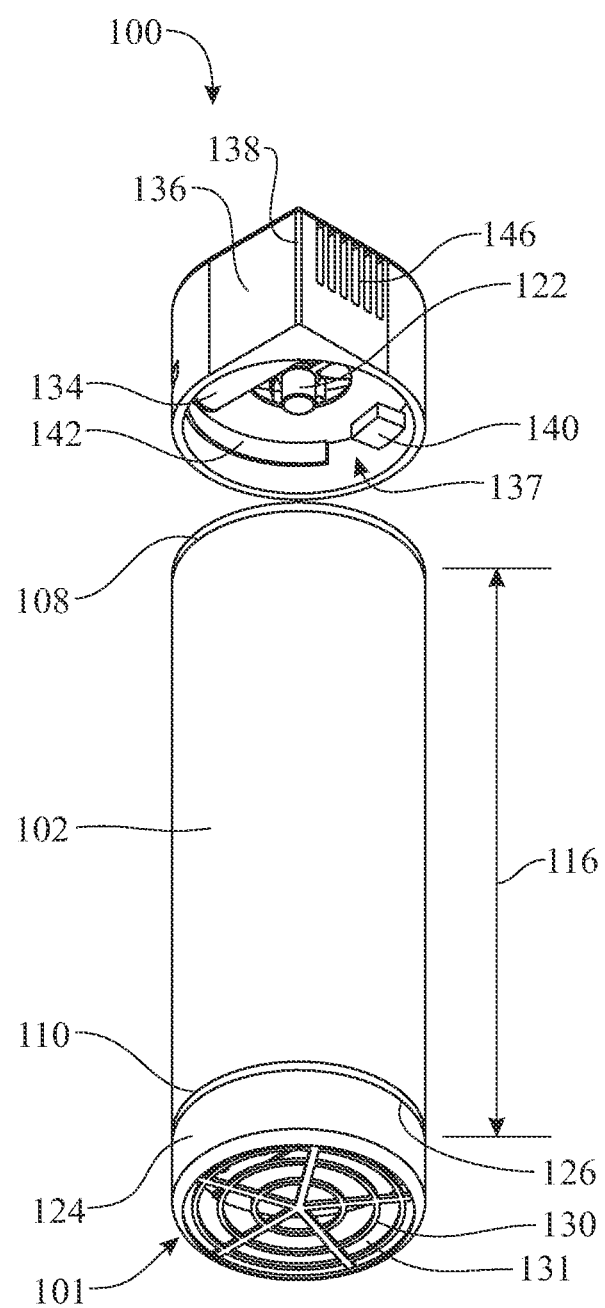
FIG. 3 presents an exploded bottom front view of the cooling device of FIG. 1.

As best shown in FIG. 4, the device body 101 further includes a second body portion 124. The second body portion 124 has a first end 126 facing the bottom end 110 of the first body portion 102 and a second end 128 opposite to the first end 126, and is attached to the bottom end 110 of the first body portion 102 at the first end 126 of the second body portion 124. The second body portion 124 comprises an internal space or second chamber 125 and includes one or more openings or air passageways for the passing of outside air into the second chamber 125. For instance, in the present embodiment, the second body portion 124 comprises a grid 130 (best shown in FIG. 3) at the second end 128 of the second body portion 124, the grid 130 comprising grid openings 131. With continued reference to FIG. 4, the openings 131 of the grid 130 of the second body portion 124 serve as air inlets, allowing outside air to enter into the second chamber 125. The plurality of holes 118 of the cover 114 of the bottom end 110 of the first body portion 102 allows for air to then pass through from the second chamber 125 into the tubes 120 within the main chamber 106 of the first body portion 102, thus coming into indirect contact with the cooling medium 104. The cooling medium 104 contained within the main chamber 106 of the first body portion 102 provides a cooling effect by heat exchange with the tubes 120, which cools the tubes 120, which in turn exchange heat with the air passing through the tubes 120, thus cooling the air. The plurality of holes 118 of the cover 112 of the top end 108 of the first body portion 102 allows cooled air to exit the tubes 120.

As shown in FIGS. 4 and 5, a water-absorbent material 132 such as, but not limited to, a sponge, can be housed within the second chamber 125 for collecting condensate from the tubes 120. In some embodiments, the water-absorbent material 132 can be removable from the second chamber 125, to allow for removal of collected water from the water-absorbent material 132. For this purpose, in some embodiments, the first end 126 of the second body portion 124 can be removably attached to the bottom end 110 of the first body portion 102, such as by a threaded or snap connection, and the second body portion 124 can be removed from the bottom end 110 of the first body portion 102 and opened to extract the water-absorbent material 132. Once the water-absorbent material 132 is at least partially dry, it can be placed back inside the second body portion 124, which can then be reattached to the bottom end 110 of the first body portion 102. In other embodiments, the second body portion 124 can be non-removably attached to the first body portion 102 and can be opened to provide access to, and allow for insertion and removal of the water-absorbent material 132 into and from the second body portion 124.

The illustration of FIG. 2 shows a fan 122 comprising a plurality of blades and a central point, with each of the plurality of blades extending radially outward from the central point of the fan 122. The fan 122 is arranged atop the cover 112 of the top end 108 of the first body portion 102. The purpose of the fan 122 is to provide a means of suction intake of air through the first body portion 102 for purposes that will be described in greater detail hereinafter.

With continued reference to FIG. 2, the fan 122 is operated by, and optionally adjacent to, a battery 134 for supplying electrical energy to the fan 122. In some embodiments, the fan 122 can have a range of speeds. The device body 101 can further include a head or third body portion 136, best shown in FIGS. 2 and 3, which can be removably attached to the top end 108 of the first body portion 102, and can house the fan 122 and the battery 134 within an internal space 137 of the third body portion 136. The third body portion 136 comprises at least one air vent, such as a plurality of air vents 146 as shown for instance in FIGS. 1 and 3, for allowing air to exit the cooling device 100 and cool the human body 156 (FIG. 7), another living being and/or the external environment. As indicated in FIGS. 1-3 and especially in FIG. 6, the third body portion 136 can have a tapered end 138 where the plurality of air vents 146 are located. The illustrations of FIGS. 3 and 4 shown that the third body portion 136 also comprises a first recess 140 in which a rotatable, user-operable wheel 148 sits. The wheel 148 is operable by a user's finger(s) to rotate within the first recess 140 of the third body portion 136, for turning the fan on and off and for adjusting the range of speeds of the fan 122. The wheel 148 is electrically connected to the battery 134 and to the fan 122 through an electrical contact (not shown) and configured to allow or prevent electrical power to be provided from the battery 134 to the fan 122. Alternative embodiments are contemplated, such as having a single user-operable control (e.g. a rotatable knob) to adjust the fan speed and/or switch the fan on and off.

As indicated in the drawings of FIGS. 2, 3 and 5, the third body portion 136 further comprises an adjustable opening 143 which can be adjusted by a user to selectively allow different amounts of outside air to enter the third body portion 136 and mix with the cooled air delivered into the third body portion 136 form the air passageways 121 to slightly warm the cooled air. The adjustable opening 143 can be slot-shaped, as shown in FIG. 2, for instance and without limitation. The slot-shaped opening 143 has a length 144. A second recessed body 142 is movably arranged along and behind the slot-shaped opening 143 and provides a movable cover for adjustably opening or closing the opening 143. A user-operable tab 150, shown in FIG. 2, is affixed to the second recessed body 142 and extends outwardly of the cooling device 100 through the opening 143. The user-operable tab 150 is slidably received in the opening 143. The tab 150 can be operated by a user's finger(s) to slide along all or part of the length 144 of the opening 143 of the third body portion 136 in one direction to open the opening 143 to allow more outside air to enter the third body portion 136, and in an opposing direction to close the second recess 142 to restrict the flow of outside air into the third body portion 136. As the fan 122 is running and air is flowing through the passageways 121 providing the coldest air possible at the plurality of air vents 146, if the air is too cold, the user-operable tab 150 and adjustable cover (second recessed body 142) may be operated to slide open a certain amount to start introducing warm air into the third body portion 136. The fan 122 mixes the warmer, outside air with the excessively cold air from the air passageways 121 and delivers a slightly less cold air to the plurality of air vents 146. In addition to provide a slightly warmer temperature to the user, operating the opening 143 to introduce outside air reduces the amount of air actually flowing through the air passageways 121, thus preserving the cooling medium 104 by not cooling as much air.

Figure 7:
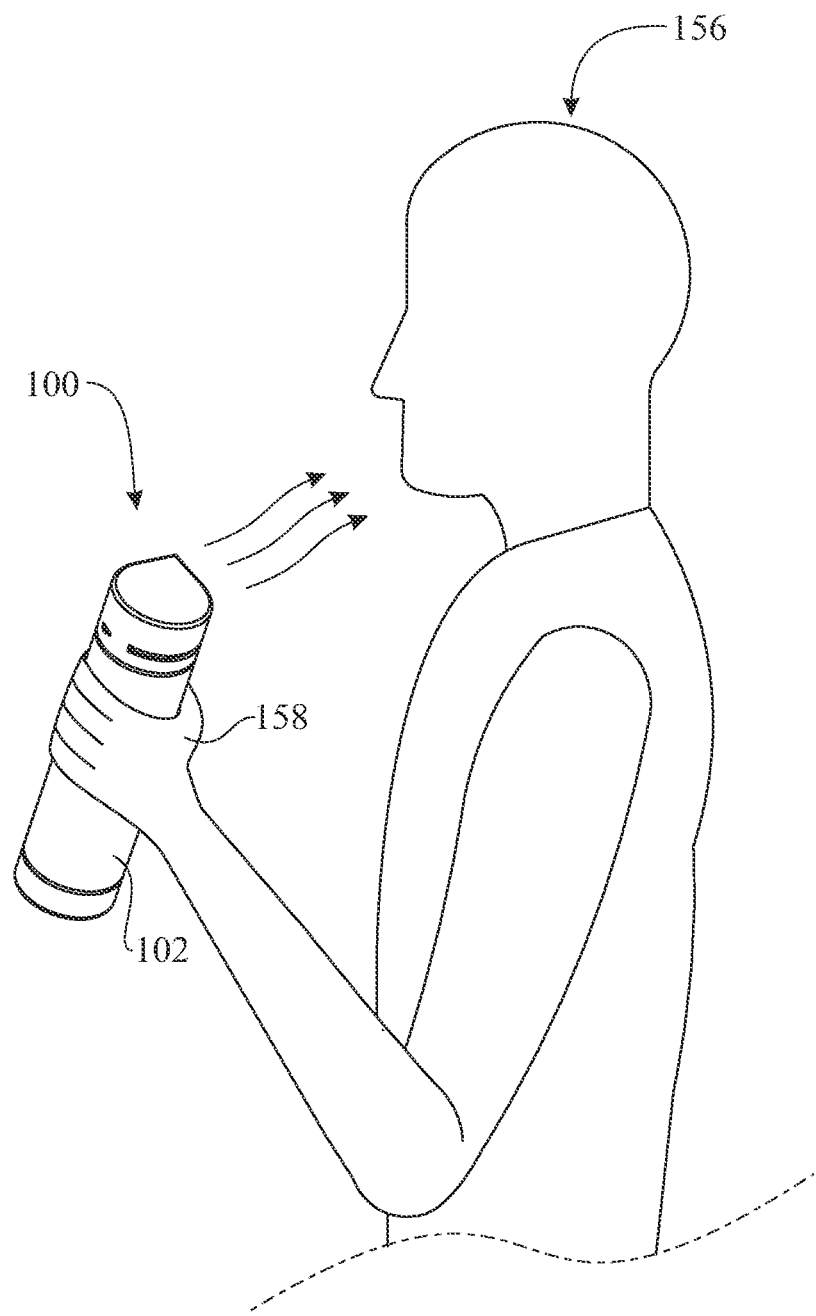
FIG. 7 presents the cooling device of FIG. 1 in use by a human.

As shown in the drawing of FIG. 7, the cooling device 100 can be held by a hand 158 of the human body 156. Specifically, a user can grasp the first body portion 102 of the cooling device 100 and orient the plurality of vents 146 (FIG. 1) towards his face, for instance and without limitation. For this purpose, the cooling device 100, and more particularly, the first body portion 102 is preferably shaped and sized to be grippable by a single hand 158 of a person. This provides a convenient way in which the cooling device 100 can be portable, as it can be picked up and carried with one hand only, while the other hand can be used to carry out different tasks. Other modes of portability will be discussed further below.

The illustration of FIG. 2 (and additionally FIGS. 4-6) shows a partition 152 separating the plurality of tubes 120 and the cooling medium 104 into two sides, each having half of the plurality of tubes 120 and half of the cooling medium 104, for instance and without limitation. The partition 152 stands longitudinally (vertically, according to the orientation of the cooling device in the drawings) along and centrally within the length 116 of the main chamber 106 of the first body portion 102, dividing the main chamber 106 into two separate sub-chambers 107. As indicated in the drawing of FIG. 2, the first end 126 of the second body portion 124 has a wall 154 half-closing the second body portion 124 at the first end 126, i.e. leaving an end opening 129 which spans along half of the total area of the first end 126 of the second body portion 124. The second body portion 124 is rotatably attached to the first body portion 102, and the wall 154 is rotatable to be selectively oriented facing each one of the two separate sub-chambers 107 within the main chamber 106, to alternately prevent air flow through each sub-chamber 107, i.e. through each of the sides of cooling medium 104 and tubes 120, thus preserving and extending the cooling effect of the cooling medium 104. For instance, the illustration of FIG. 4 shows the wall 154 rotated to a leftmost position in which the wall 154 is blocking airflow through the left-hand side sub-chamber 107, thus preserving cool temperature of the cooling medium 104 on the left-hand side sub-chamber 107, while airflow is allowed through the end opening 129 of the second body portion 124 and through the right-hand side sub-chamber 107 in order to cool the air using the cooling medium 104 housed in the right-hand side sub-chamber 107. This allows to increase the usable time of the cooling device 100.

In some embodiments, the first body portion 102 is disconnectably attached to the second body portion 124 and/or to the third body portion 136, such as by a threaded connection, bayonet connection, snap fastener connection, friction fit, magnetic connection or combination thereof, for instance and without limitation. Preferably, the first body portion 102 is disconnectably attached to both the second body portion 124 and the third body portion 136, allowing both the second body portion 124 and the third body portion 136 to be removed from the first body portion 102. The first body portion 102 can then be disconnected and stored in a cooler or freezer for cooling or freezing the cooling medium 104 in preparation for subsequent use of the cooling device 100. Once the cooling medium 104 has been cooled or frozen, the second body portion 124 and third body portion 136 can be reattached to the first body portion 102 to once more use the cooling device 102.

Figure 8:
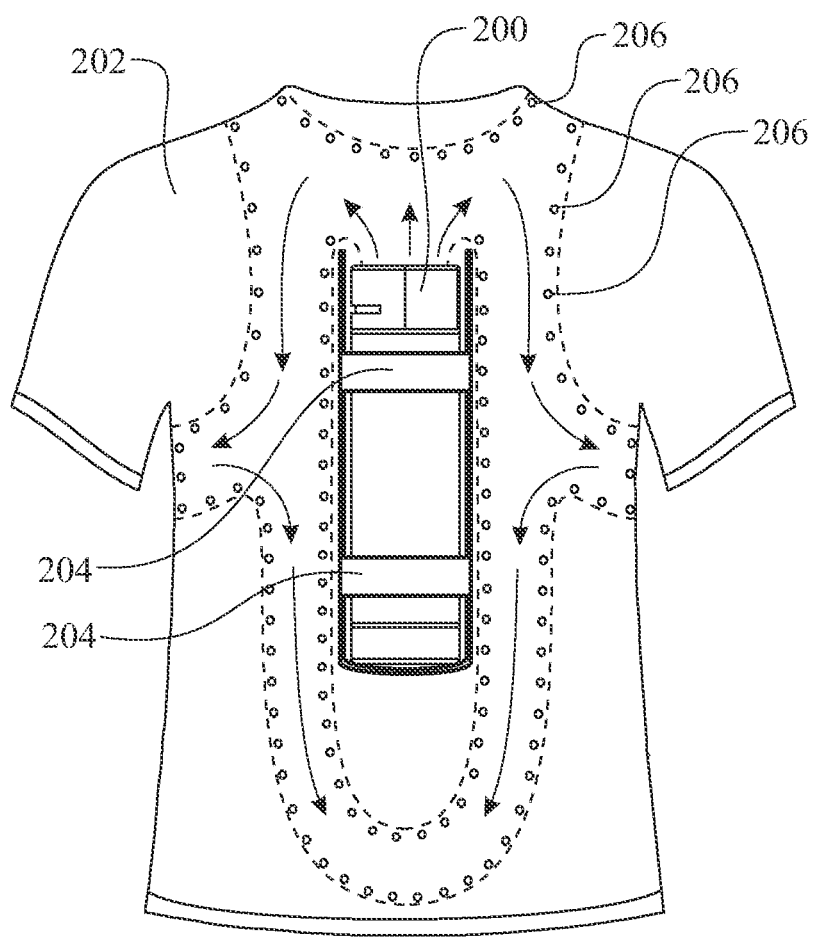
FIG. 8 presents a rear elevation view of a cooling device in accordance with a second illustrative embodiment of the invention.
Figure 9:
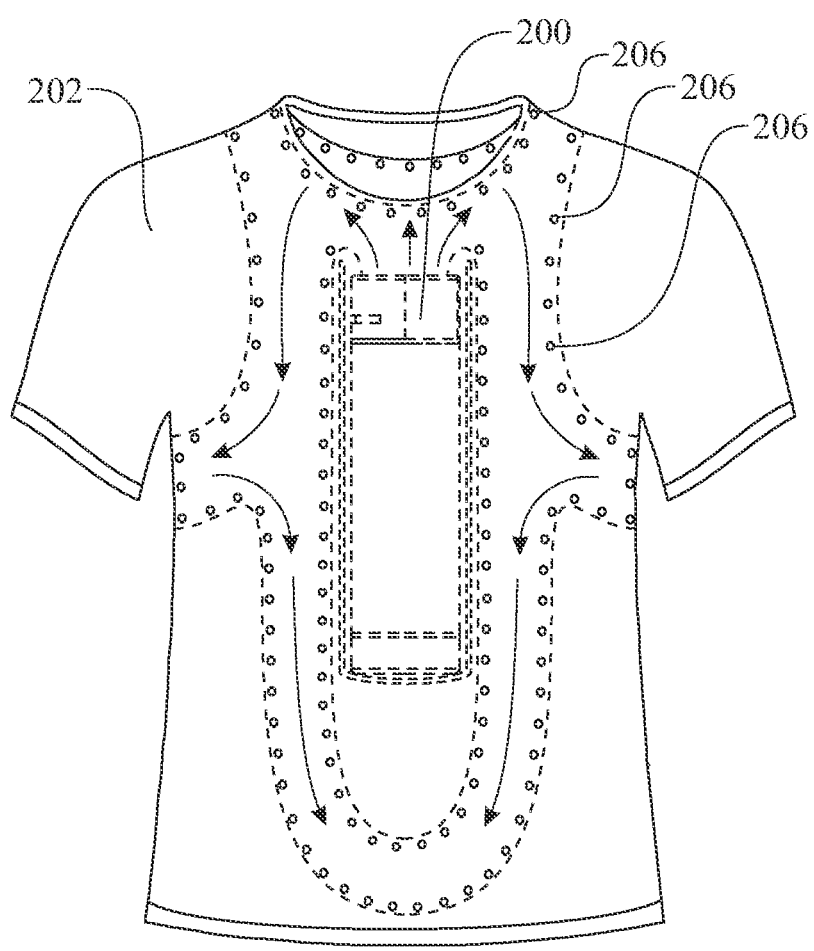
FIG. 9 presents a front elevation view of the cooling device of FIG. 8.

The illustrations of FIGS. 8 and 9 show a cooling device 200 in accordance with a second embodiment of the invention. The cooling device 200 can be constructed identically to the cooling device 100 of FIGS. 1-7 and has an outer surface. A shirt 202 is depicted, comprising at least one strap 204 for securing the cooling device 200 via the outer surface of the cooling device 200, to be worn on the human body 156. The shirt 202 further comprises a plurality of holes 206, facing towards the human body 156, for receiving air flow from a plurality of air vents (similarly to the plurality of air vents 146 described heretofore) of a third body portion of the cooling device 200 to cool the human body 156.

In further embodiments of the invention, the cooling device 100 can be sized and shaped to fit a variety of applications. For instance, the cooling device 100 can be of a shape and size that would fit within a cup holder (not pictured). This increases the versatility and portability of the cooling device 100.

In another embodiment of the invention, the fan 122 can be connected to, and operated by, an external electrical power supply (not pictured), rather than the battery 134. This could be done in a scenario in which it is necessary to have the cooling device 100 placed in a given location for an extended period of time, and the battery 134 may not be present for use. It could also be done in a situation in which the battery 134 dies out, and again, there is no replacement battery available, but an external electrical power supply is available.

In a further embodiment, the cooling device 100 can further include a plurality of attachments and tubing (not pictured) for promoting increased air flow. This may be useful, for instance, in a situation in which multiple people are present in a larger room, and more air flow is required.

Figure 10:
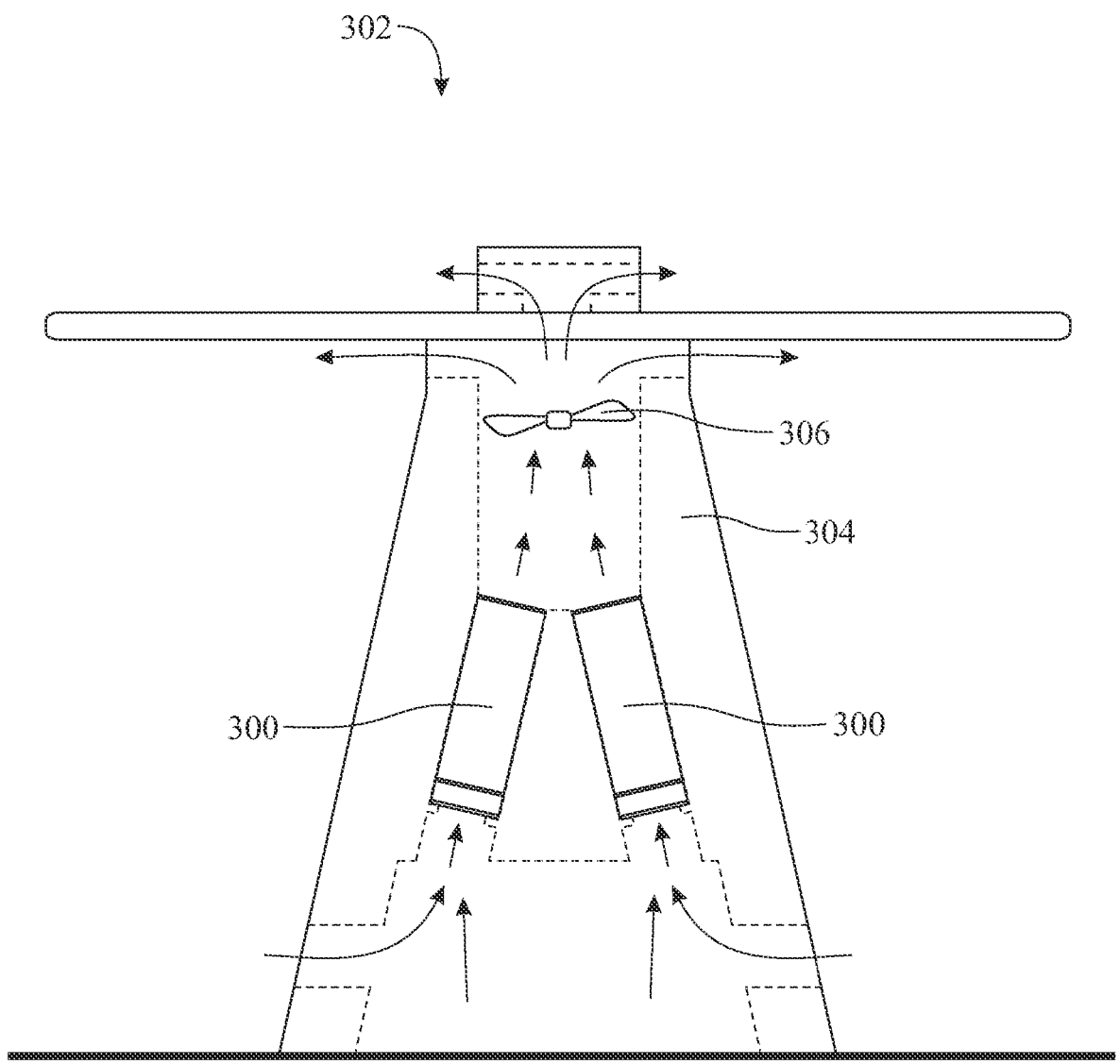
FIG. 10 presents a front elevation view of a cooling device in accordance with a third illustrative embodiment of the invention.
Figure 11:
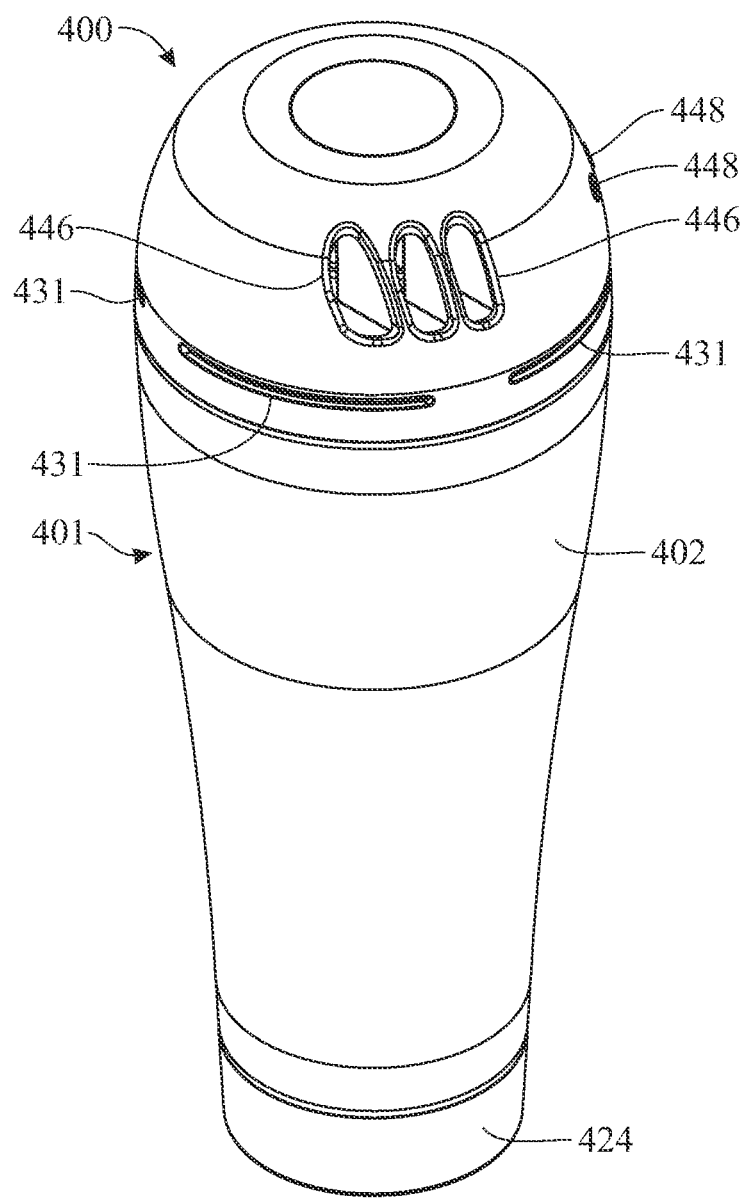
FIG. 11 presents a top front perspective view of a cooling device in accordance with a fourth illustrative embodiment of the invention, the cooling device shown assembled.

In yet another embodiment, illustrated in FIG. 10, an assembly 302 of a cooling device 300 includes at least one entity of a cooling device 300 (for example, two devices 300 as shown) which can be constructed identically to the cooling device 100 of FIGS. 1-7 and can be attached to an object 304. The assembly 302 can have at least one of the cooling devices 300 with a third body portion removed. It is also possible in the assembly 302 that a fan 306 operates outside of the third body portion and is attached to the object 304. The drawing of FIG. 10 specifically demonstrates the object 304 being a table, with two entities of the cooling device 300 being attached at different points on the table. The third body portion of each device 300 is removed, and there is at least one fan 306 attached to the table, operating outside of the third body portion of each device 300. The benefit of such an embodiment, and versatility of the cooling device 300, is that it can be used in a variety of situations. In the case of the table for instance, the cooling device 300 can be used for an outdoor event such as a picnic. The assembly 302 shown in FIG. 10 would provide a more efficient cooling system for a greater area and number of people.

Significant advantages of the present embodiment of the invention are that it allows for the cooling effect of the cooling medium 104 to be preserved and extended, and that, via the shirt 202 in the second embodiment, the cooling device 200 can be attached more firmly to the human body 156. Also, in the further embodiment, the cooling device 300 can be reassembled to attach to an object 304 in a way that maximizes the cooling effect.

The illustrations of FIGS. 11-14 show a cooling device 400 in accordance with a fourth illustrative embodiment of the invention. Like features of the cooling device 400 and the cooling device 100 of FIGS. 1-7 are numbered the same except preceded by the numeral '4'. Similarly to the first embodiment, the cooling device 400 is configured to provide cool air to a living being or an external environment, and includes a hollow, device body 401 shaped and sized to be grasped by a hand of a user and comprising a first body portion 402, a second body portion 424 and a third body portion 436. Similarly to the first embodiment, the second body portion 424 and third body portion 436 are arranged at opposite, bottom and top ends of the first body portion 402.

Figure 12:
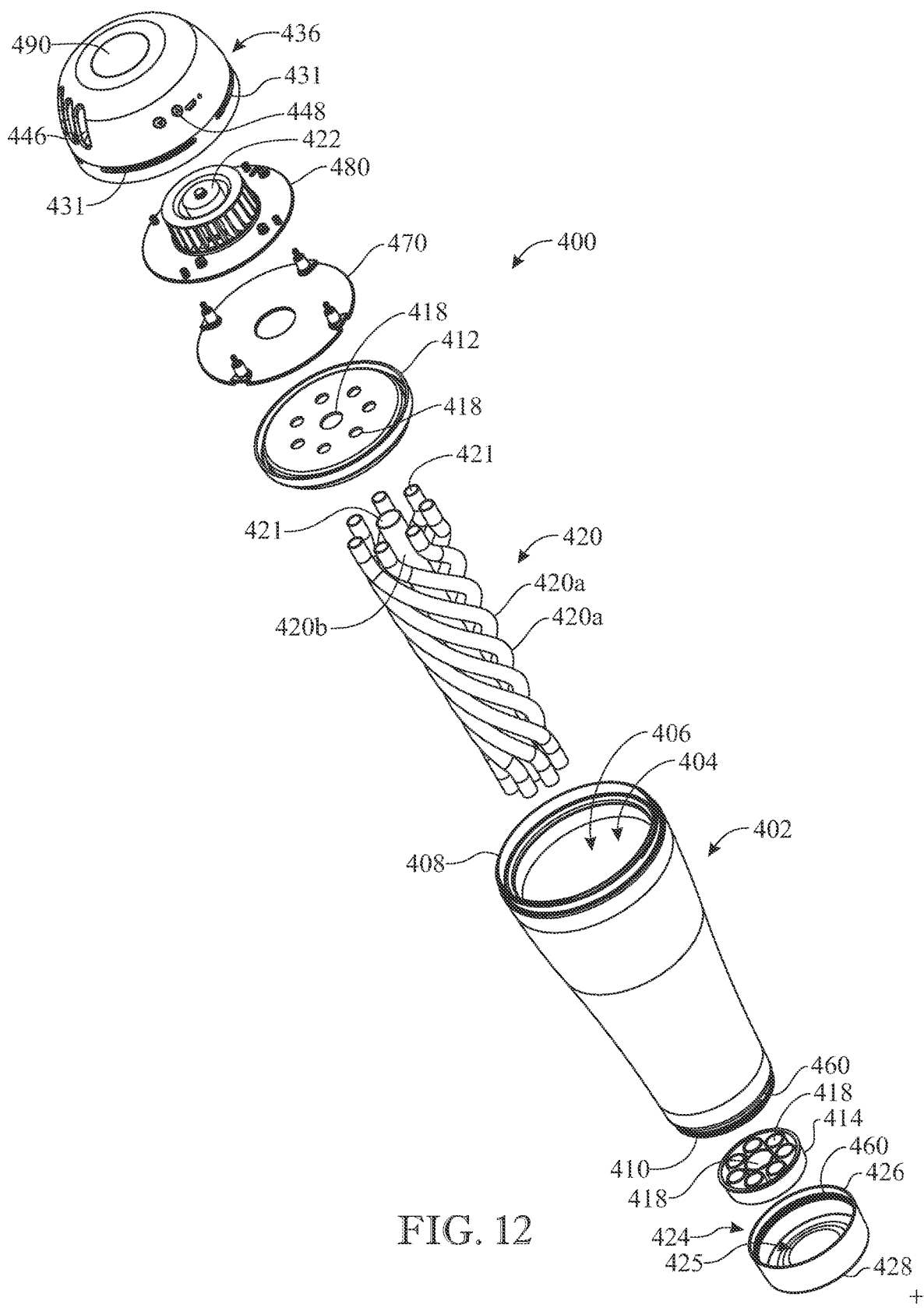
FIG. 12 presents an exploded top front perspective view of the cooling device of FIG. 11.
Figure 13:
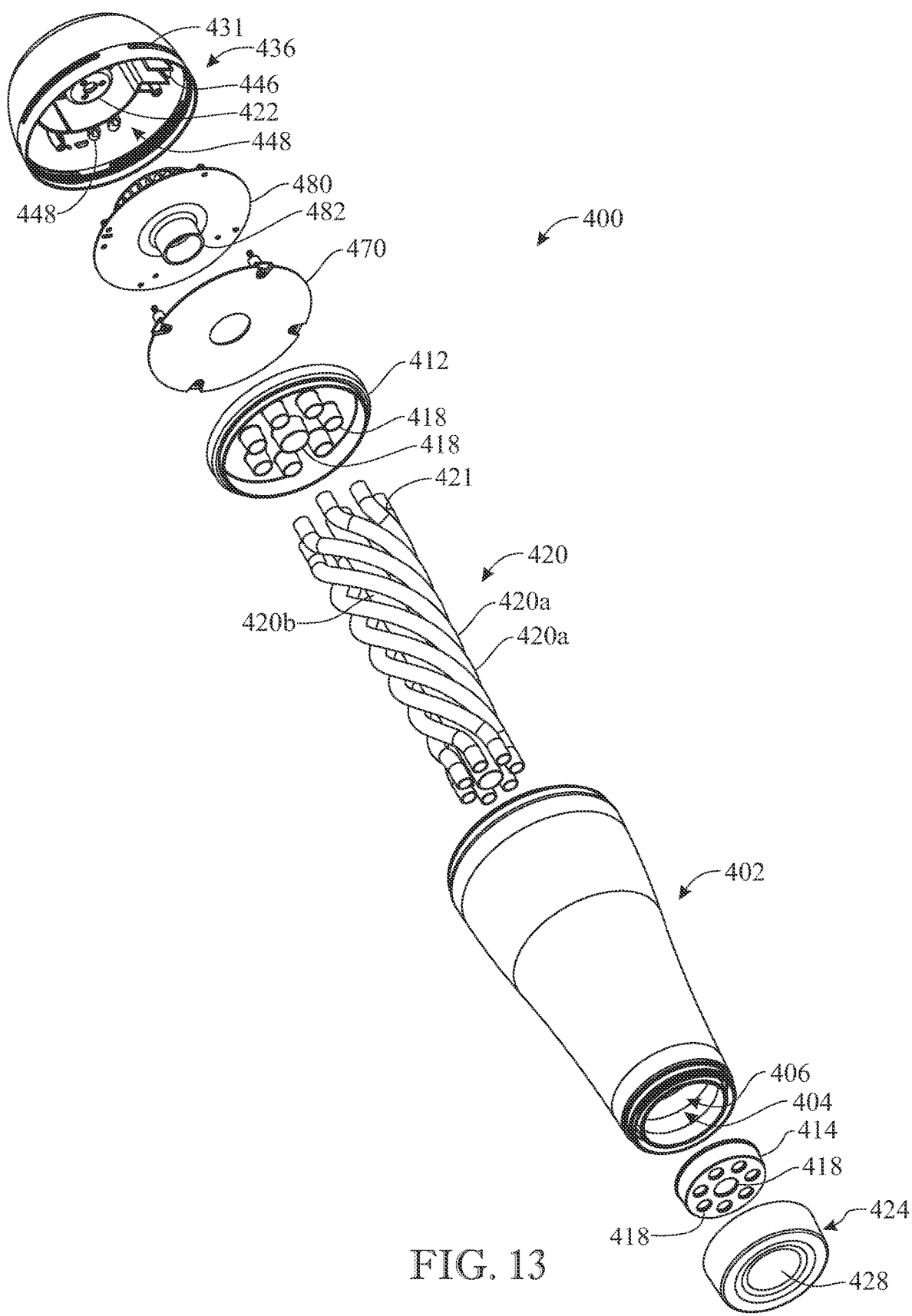
FIG. 13 presents an exploded bottom rear perspective view of the cooling device of FIG. 11.
Figure 14:
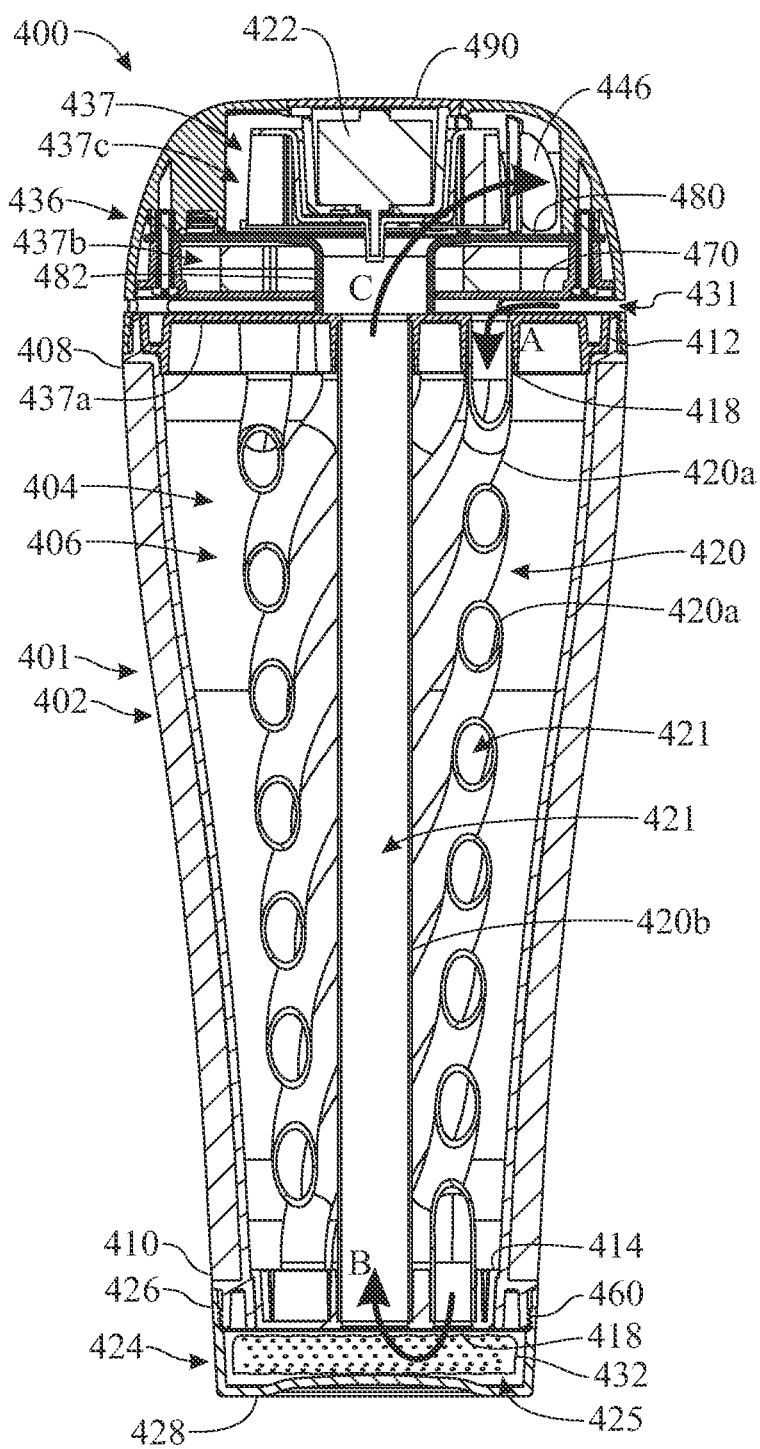
FIG. 14 presents a cross-sectional side elevation view of the cooling device of FIG. 11.

As shown in FIGS. 12 and 14, the first body portion 402 is hollow and defines an internal space or main chamber 406 which contains a cooling medium 404. A top cover 412 and a bottom cover 414 close a top end 408 and a bottom end 410 of the first body portion 402, respectively. The top and bottom covers 412 and 414 comprise a plurality of through holes or openings 418. A plurality of tubes 420 extends through the main chamber 406 and cooling medium 404, from the top cover 412 to the bottom cover 414. The plurality of tubes 420 comprises several coiled or helicoidal tubes 420a and one straight tube 420b for purposes that will be hereinafter described. The straight tube 420b can be arranged centrally, with the helicoidal tubes 420a arranged around the straight tube 420b, to optimize integration contribute to obtaining a compact, yet efficient cooling device 400. Each tube 420a, 420b is hollow and provides an air passageway 421 therewithin. The top end of each tube 420a, 420b is in fluid communication with a respective opening 418 in the top cover 412. Similarly, the bottom end of each tube 420a, 420b is in fluid communication with a respective opening 418 in the bottom cover 414.

The second body portion 424, in turn, comprises a first end 426 facing the bottom end 410 of the first body portion 402 and a second end 428 opposite to the first end 426, and is attached to the bottom end 410 of the first body portion 402 at the first end 426 of the second body portion 424. The second body portion 424 comprises an internal space or second chamber 425. Unlike the first embodiment, however, the second end 428 of the first body portion 402 is closed, i.e. has no openings for the passage of air. The second chamber 325 can optionally house a water-absorbent material 432 such as, but not limited to, a sponge, for collecting condensate from the tubes 420. In some embodiments, the water-absorbent material 432 can be removable from the second chamber 425, to allow for removal of collected water from the water-absorbent material 432. For this purpose, in some embodiments, the first end 426 of the second body portion 424 can be removably attached to the bottom end 410 of the first body portion 402, such as by a threaded connection 460, and the second body portion 424 can be removed from the bottom end 410 of the first body portion 402 to extract the water-absorbent material 432. Alternative embodiments are contemplated, however, in which the second body portion 424 is non-removably attached to the first body portion 402 and can include a door or cover which can be opened to provide access to, and allow for insertion and removal of the water-absorbent material 432 into and from the second chamber 425.

The third body portion 436, or head, in turn comprises an internal space 437 which is divided into a first internal space 437a, a second internal space 437b and a third internal space 437c. More specifically, the third body portion 436 includes a first intermediate divider 470 and a second intermediate divider 480, best shown in FIGS. 12 and 13. The first intermediate divider 470 is arranged topward of the top cover 412 and the second intermediate divider 480 is arranged topward of the first intermediate divider 470. The first internal space 437a is arranged between the top cover 412 and the first intermediate divider 470. The second internal space 437b is arranged between the first intermediate divider 470 and the second intermediate divider 480. In turn, the third internal space 437c is arranged between the second intermediate divider 480 and a top side of the third body portion 436. At least one air inlet 431 is formed in the third body portion 436, and more particularly, in fluid communication with the first internal space 437a allowing air to enter the first internal space 437a from outside the cooling device 400. The at least one air inlet 431, first internal space 437a and openings 418 in the top cover 412 are communicated, such that air entering the internal space 437a via the air inlet(s) 431 can pass through the openings 418 and enter the helicoidal tubes 420a. In turn, at least one air vent or outlet 446 is formed in the device body 401 for allowing cooled air to exit the cooling device 400. More specifically, the one or more air outlets 446 are disposed between the second intermediate divider 480 and the top side 490 such that the air outlet(s) 446 are communicated with the third internal space 437c. The second intermediate divider 480 comprises a downwardly protruding neck 482 which contacts the top cover 412 and airtightly surrounds the central opening 418 of the top cover 412 which corresponds to the straight tube 420b. As will be best appreciated in FIG. 14, the straight tube 420b extends from, and provides fluid communication between, the second chamber 425 of the second body portion 424 and the third internal space 437c of the third body portion 436, and is isolated from the first internal space 437a.

The third body portion 436 can house a fan 422 and one or more batteries (not shown), such as within the third internal space 437c. At least one user-operable control 448 may be provided on the cooling device 400, such as in the third body portion 436, to operate the fan 422 to switch on/off and change speeds, for instance and without limitation. In some embodiments, the third body portion 436 can be removably attached to the top end 408 of the first body portion 402. Alternatively, the third body portion 436 may be non-removably attached to the first body portion 402. In some embodiments, the one or more batteries 434 may be accessed for replacement. In other embodiments, the one or more batteries 434 may be rechargeable by an external power source.

In operation, the user starts by operating the user-operable controls 448 to power on the fan 422. Rotation of the fan 422 causes outside air to be suctioned through the air inlets 431 and into the third internal space 437c of the third body portion 436, and forced through the openings 418 and into the helicoidal tubes 420a as indicated by arrow A. As the fan 422 continues to function, air flows through the helicoidal tubes 420a and is cooled by heat exchange with the cooler, cooling medium 404 which is disposed around the helicoidal tubes 420a. The helicoidal shape of the tubes increases the distance traveled by the air along the tubes 420a and therefore contributes to increase cooling. The cooled, flowing air eventually enters the second chamber 425 of the second body portion 424 via the openings 418 in the bottom cover 414 and is forced through the central opening 418 and into the central, straight tube 420b as indicated by arrow B. In turn, condensate water which may form as a result of the cooling process can be carried by the cooled air and/or fall downward along the internal walls of the helicoidal tubes 420a, and may reach the second chamber 425 and become absorbed by the water-absorbent material 432 housed therewithin. The cooled air being forced upward along the straight tube 420b enters the third internal space 437c via the central opening 418 of the top cover 412 and is forced out of the cooling device 400 via the one or more air outlets 446. It must be noted that the central tube being straight further contributes to reduce the temperature of the cooled air delivered by the cooling device 400.

Similarly to the embodiment of FIGS. 1-7, the first body portion 402 can include at least one thermal insulation material. In some embodiments, the top and bottom covers 412, 414 can also be made of at least one thermal insulation material. Thus, the main chamber 406 can be thermally insulated allowing the cooling medium 404 to remain cool for an extended period of time. In some embodiments, the second body portion 424 and/or third body portion 436 can be made of at least one thermally insulated material, further contributing to reduce internal air temperature and preserve the cooling medium 404.

Figure 15:
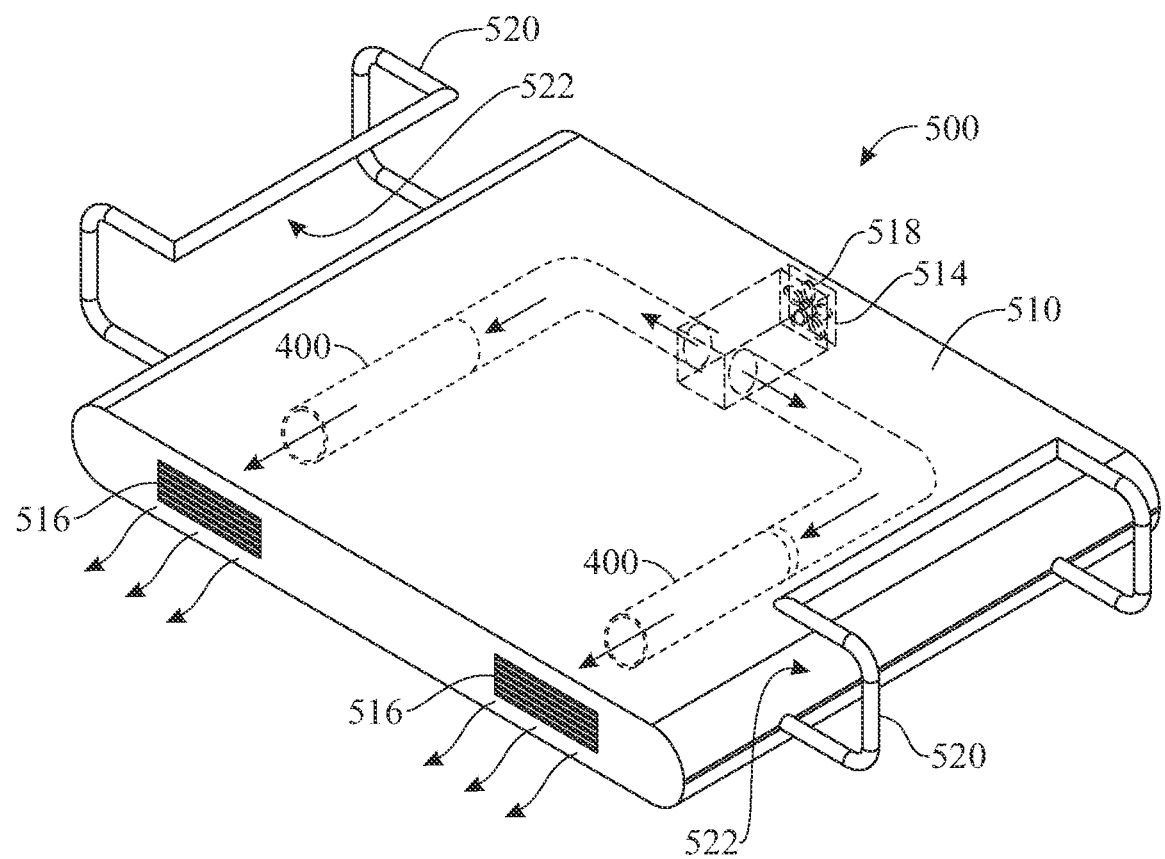
FIG. 15 presents a top front isometric view of a cooling device in accordance with a fifth illustrative embodiment of the invention, including a housing and two opposite side clipping wings for attaching the housing to a golf cart or other vehicle roof.

The illustration of FIG. 15 presents a further embodiment of the invention, in which a cooling device 500 is configured to be installed in a vehicle such as, but not limited to, a golf cart. For this purpose, the cooling device 500 comprises a housing 510 containing one or more cooling devices 400 (or cooling devices 100). At least one air inlet 514 provides airflow from outside the housing to the air inlets 431 of the one or more cooling devices 400. In turn, the air outlets 446 of the fluid devices 400 are in fluid communication with one or more air outlets 516 of the housing. At least one fan 518 can be disposed with the housing 510 and configured to cause air to flow from the air inlets 514 to the air outlets 516. As air flows through the housing 510, it passes through and is cooled by the cooling devices 400. The cooling device 500 further includes at least one fastener for securing the cooling device 500 to the vehicle. For instance and without limitation, the cooling device 500 can include two opposite inwardly-folded wings 520, which define two inwardly-facing spaces 522 shaped and sized to receive a roof of a golf cart (not shown), with the wings 520 clipping onto opposite sides of the roof.

In summary, the cooling device of the present invention provides a convenient, portable cooling device that improves the delivery of cooled air, both in terms of temperature and volumetric flowrate. In regard to temperature, the cooling effect is enhanced by having the air passageways or tubes disposed through the cooling medium and in direct communication with the cooling medium thus improving heat transfer between the cooling medium and the air passing through the air passageways. In regard to volumetric flow rate, the use of a variable speed fan allows a user to easily adjust the air flow rate, allowing more or less cooling to be delivered to the user, either to prolong the usable time of the device or to simply vary the temperature of the delivered air for comfort reasons. Furthermore, ease of use is improved by combining a housing, cooling medium and passageways into a single, rechargeable body part or cell which can be separated from the remaining cooling device parts and placed in a cooler or freezer for "recharging". In fact, such modular nature of the invention allows for multiple cells (first body portions) to be kept in a cooler or freezer for quick, convenient exchange. When one cell (first body portion) expires, the user simply detaches the fan module (third body portion) and the bottom module (second body portion) from the expired cell, retrieves a readily-available, cooled cell and attaches the fan and bottom modules to the cooled cell while placing the expired cell in a cooler or freezer for cooling. The modular nature of the invention also allows for virtually any number of cells to be attached in series or parallel to provide either more cooling air or a longer run time. This modular approach allows for different types of fans and discharge air methods to be provided. Due to its compact and integrated, cell-like design, the cooling device of the present invention can be easily placed in and removed from custom air paths as described, for instance, with reference to FIGS. 10 and 15.

In a further advantageous effect of the invention, having the air passageways or tubes extend through the cooling medium allows to obtain a more compact device, increasing portability and facilitating storing the device or placing it in a cooler or freezer. In addition, the cooling device can manage the unavoidable condensate that forms from the cooling of air to near its saturation point by providing an absorbing material in a catchment tank, thus preventing the condensate from splashing out or overflowing, potentially wetting the user or surrounding objects or material.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A cooling device for providing cool air to a living being or an external environment, comprising:
 a hollow, device body comprising:
  a first body portion carrying a first cover and a second cover at a proximal end and a distal end, respectively, of the first body portion, the first body portion and the first and second covers fully enclosing a main chamber containing an amount of a cooling medium, the first body portion comprising a plurality of air passageways extending through the cooling medium such that the plurality of air passageways is surrounded in its entirety by the cooling medium and each air passageway of the plurality of air passageways is surrounded in its entirety by the cooling medium, each air passageway comprising a respective proximal end and a respective distal end arranged at the proximal end and distal end of the first body portion, respectively, wherein the distal ends of the air passageways are in fluid communication with one another, and
  a fan body portion, disconnectably attachable to the proximal end of the first body portion, the fan body portion containing a fan; and
 at least one air inlet and at least one air outlet formed in the device body; wherein
 the cooling device is configured to selectively switch between:
  a first configuration and a second configuration, wherein, in both the first configuration and the second configuration, the first body portion and the first and second covers fully enclose the cooling medium such that said amount of cooling medium remains constant, wherein
  in the first configuration, the fan body portion is disconnected from the first body portion, and the first body portion and the first and second covers are jointly portable by a single hand of a user, and the cooling medium is coolable by placing the first body portion and the first and second covers in a cooler or freezer; and
  in the second configuration, the fan body portion is attached to the first body portion, and the device body is portable by said single hand of said user, and fluid communication is provided from the at least one air inlet to the at least one air outlet via the plurality of air passageways to drive air from outside the cooling device through the at least one air inlet, cool said air by heat exchange with the cooling medium as the air passes through the plurality of air passageways, and deliver said cooled air through the at least one air outlet responsively to operation of the fan.

2. The cooling device of claim 1, wherein the at least one air inlet is formed in the fan body portion.

3. The cooling device of claim 2, wherein the at least one air outlet is formed in the fan body portion.

4. The cooling device of claim 3, wherein the plurality of air passageways comprises first and second subsets of air passageways, and further wherein said fluid communication in the second configuration of the cooling device is provided sequentially from the at least one air inlet, through the fan body portion, through the proximal end of each passageway of the first subset of air passageways, through the first subset of air passageways, through the distal end of each passageway of the first subset of air passageways, through the distal end of each passageway of the second subset of air passageways, through the second subset of air passageways, through the proximal end of each passageway of the second subset of air passageways, through the fan body portion, and to the at least one air outlet.

5. The cooling device of claim 4, wherein the first subset of air passageways comprises a plurality of coiled passageways and the second subset of air passageways comprises a central passageway, wherein the coiled passageways are coiled around the central passageway.

6. The cooling device of claim 5, wherein the central passageway is straight.

7. The cooling device of claim 1, wherein the device body further comprises a second body portion, arranged at the distal end of the first body portion and comprising an internal space providing fluid communication between the distal ends of the plurality of air passageways.

8. The cooling device of claim 7, wherein the at least one air inlet is formed in the second body portion and provides fluid communication from an outside of the device body to the distal ends of the plurality of air passageways via the internal space of the second body portion.

9. The cooling device of claim 8, wherein the at least one air outlet is formed in the fan body portion.

10. The cooling device of claim 9, wherein said fluid communication in the second configuration of the cooling device is provided sequentially from the at least one air inlet, through the internal space of the second body portion, through the distal end of each air passageway, through each air passageway, through the proximal end of each air passageway, through the fan body portion, and to the at least one air outlet.

11. The cooling device of claim 7, wherein the second body portion is disconnectably attachable to the first body portion, and further wherein, in the first and second configurations of the cooling device, the second body portion is disconnected from and attached to the first body portion, respectively.

12. The cooling device of claim 7, further comprising a water-absorbent material contained within the internal space of the second body portion, wherein the water-absorbent material is configured to collect condensate from outside air circulating through the plurality of air passageways.

13. The cooling device of claim 12, wherein the water-absorbent material is removable from the internal space of the second body portion.

14. The cooling device of claim 1, wherein the device body comprises an adjustable opening configured to allow an adjustable amount of outside air to enter the device body and mix with the cooled air prior to the cooled air being delivered outwardly from the device body through the at least one air outlet.

15. The cooling device of claim 1, further comprising a plurality of tubes, wherein each air passageway of the plurality of air passageways is provided by an internal space of a respective tube of the plurality of tubes.

16. The cooling device of claim 15, wherein each tube comprises protruding fins that protrude into the cooling medium or the internal space of said each tube.

17. The cooling device of claim 1, wherein the at least one air outlet is formed in the fan body portion, and the cooling device further comprises a user-operable control located in the fan body portion and configured to operate the fan.

18. A cooling device for providing cool air to a living being or an external environment, comprising:
  a hollow, device body comprising:
    a first body portion carrying a first cover and a second cover at a proximal end and a distal end, respectively, of the first body portion, the first body portion and the first and second covers fully enclosing a main chamber containing an amount of a cooling medium, the first body portion comprising a plurality of air passageways extending through the cooling medium such that the plurality of air passageways is surrounded in its entirety by the cooling medium and each air passageway of the plurality of air passageways is surrounded in its entirety by cooling medium, each air passageway comprising a respective proximal end and a respective distal end arranged at the proximal end and distal end of the first body portion, respectively, wherein the distal ends of the air passageways are in fluid communication with one another,
    a second body portion, disconnectably attachable to the distal end of the first body portion and comprising an internal space providing fluid communication between the distal ends of the plurality of air passageways,
    a fan body portion, disconnectably attachable to the proximal end of the first body portion, the fan body portion containing a fan,
    a water-absorbent material contained within the internal space of the second body portion, wherein the water-absorbent material is configured to collect condensate from outside air circulating through the plurality of air passageways; and
  at least one air inlet and at least one air outlet formed in the device body; wherein the cooling device is configured to selectively switch between:
- a first configuration and a second configuration, wherein, in both the first configuration and the second configuration, the first body portion and the first and second covers fully enclose the cooling medium such that said amount of cooling medium remains constant, wherein
- in the first configuration, the second body portion and the fan body portion are disconnected from the first body portion, and the first body portion and the first and second covers are jointly portable by a single hand of a user, and the cooling medium is coolable by placing the first body portion and the first and second covers, in a cooler or freezer, and
- in the second configuration, the second body portion and the fan body portion are attached to the first body portion, and the device body is portable by said single hand of said user, and fluid communication is provided from the at least one air inlet to the at least one air outlet via the plurality of air passageways to drive air from outside the cooling device through the at least one air inlet, cool said air by heat exchange with the cooling medium as the air passes through the plurality of air passageways, and deliver said cooled air through the at least one air outlet responsively to operation of the fan.

* * * * *